United States Patent
Choi

(10) Patent No.: US 9,181,133 B1
(45) Date of Patent: Nov. 10, 2015

(54) CRYSTALLIZED SILICATE POWDER BY SYNTHESIZED AND HIGH STRENGTHENED PORCELAIN BODY HAVING THE SAME

(71) Applicant: Korea Institute of Ceram Choice LTD, Daejeon (KR)

(72) Inventor: Eui Seok Choi, Seoul (KR)

(73) Assignee: Korea Institute of Ceram Choice LTD, Daejeon (KR)

( * ) Notice: Subject to any disclaimer, the term of this patent is extended or adjusted under 35 U.S.C. 154(b) by 0 days.

(21) Appl. No.: 14/277,049

(22) Filed: May 14, 2014

(51) Int. Cl.
 *C04B 33/36* (2006.01)
 *C04B 33/24* (2006.01)

(52) U.S. Cl.
 CPC ......... *C04B 33/24* (2013.01); *C04B 2235/3217* (2013.01); *C04B 2235/3463* (2013.01); *C04B 2235/3481* (2013.01)

(58) Field of Classification Search
 CPC .... C04B 35/185; C04B 35/195; C04B 33/00; C04B 33/24; C04B 33/36
 See application file for complete search history.

(56) References Cited

U.S. PATENT DOCUMENTS 5,455,210 A * 10/1995 Kreiner ........................... 501/32
5,614,448 A * 3/1997 Kreiner ........................... 501/32

FOREIGN PATENT DOCUMENTS

GB 2309223 * 7/1997

* cited by examiner

*Primary Examiner* — Karl Group

(57) ABSTRACT

The present invention discloses crystallized silicate-synthetic powder comprising a mullite ($3Al_2O_3.2SiO_2$) crystalline phase, a anorthite ($CaO.Al_2O_3.2SiO_2$) crystalline phase, and a corundum ($Al_2O_3$) crystalline phase, and discloses a high-strengthened porcelain body containing the above crystallized silicate-synthetic powder and formed by mixing the crystallized silicate-synthetic powder and kaolin mineral.

5 Claims, 8 Drawing Sheets

FIG. 712.—System MgO–Al₂O₃–SiO₂; composite.

E. F. Osborn and Arnulf Muan, revised and redrawn "Phase Equilibrium Diagrams of Oxide Systems," Plate 3, published by the American Ceramic Society and the Edward Orton, Jr., Ceramic Foundation, 1960.

CRYSTALLIZED SILICATE POWDER BY SYNTHESIZED AND HIGH STRENGTHENED PORCELAIN BODY HAVING THE SAME

BACKGROUND OF THE INVENTION

1. Field of the Invention

The present invention relates to crystallized silicate-synthetic powder and a high strengthened porcelain body including the same and withstanding to external shock.

2. Description of the Related Art

A silicate porcelain body is made with natural clay material such as clay and kaolin and made through traditional fabricating processes such as a mixing process, a finely-pulverizing process, a forming process and a sintering process. The silicate porcelain body is formed a pivot of traditional ceramics with glass, refractories and cement. The silicate porcelain body requires an increase of strength to be prevented from be damaged due to external shock in use. Also, the silicate porcelain body requires a decrease of shrinkage degree to minimize deformation in a sintering process.

In current, the silicate porcelain body which has been produced in Korea has the flexural strength of approximately 90 to 100 MPs which is lower than that of tableware of hotel such as a high-temperature porcelain and Glassy Corelle which are foreign famous product. Therefore, the silicate porcelain body which is produced domestically is to be required to increase a material property of such as the flexural strength. Also, the silicate porcelain body is required to possess a relatively low thermal shrinkage with the high flexural strength. However, there is a problem that the thermal shrinkage is also increased if the flexural strength is increased.

In current, the many researches for a high purification of a raw material, developing and mixing new sintering agents have been carried out for enhancing the material properties and characteristics of the silicate porcelain body. However, the above researches are essentially staying a limited range using feldspar as the sintering agent. In addition, the silicate porcelain body is made with multi-element natural mineral and made through the sintering and melting processes which are simultaneously carried out. Therefore, it is difficult to enhance the material properties such as the strength or the thermal shrinkage of the silicate porcelain body.

SUMMARY OF THE INVENTION

An object of the present invention is to provide a crystallized silicate-synthetic powder which can increase the strength of porcelain body and to provide a high-strengthened porcelain body including the same.

The crystallized silicate-synthetic powder of the present invention includes a mullite ($3Al_2O_3.2SiO_2$) crystalline phase, a anorthite ($CaO.Al_2O_3.2SiO_2$) crystalline phase and a corundum ($Al_2O_3$) crystalline phase.

In the crystallized silicate-synthetic powder, at this time, a fraction of the anorthite crystalline phase may be 30 to 50%, a fraction of the mullite crystalline phase may be 30 to 50% and a faction of the corundum crystalline phase may be 10 to 30% in a fraction of crystalline phase.

In addition, the crystallized silicate-synthetic powder may be formed by mixing kaolin ($Al_2O_3.2SiO_2$), dolomite ($CaCO_3.MgCO_3$), limestone ($CaCO_3$) and alumina ($Al_2O_3$).

The high-strengthened porcelain body of the present invention is formed by mixing the crystallized silicate-synthetic powder illustrated as above and kaolin mineral. At this time, the high-strengthened porcelain body may be formed by mixing the crystallized silicate-synthetic powder of 20 to 30 weight % and the kaolin mineral of 70 to 80 weight % with respect to the total weight of the high-strengthened porcelain body.

In addition, the high-strengthened porcelain body may further comprise a mullite crystalline phase, a anorthite crystalline phase and a corundum crystalline phase which are formed by the crystallized silicate-synthetic powder, a spinel crystalline phase which is the second crystalline phase and formed in liquid sintering process, a cordierite crystalline phase which is the third crystalline phase and formed in the liquid sintering process.

The crystallized silicate-synthetic powder and the high-strengthened porcelain body of the present invention is effective for increasing strength of the porcelain body since the crystalline phases of the crystallized silicate-synthetic powder are distributed uniformly in the porcelain body in the sintering process after the crystallized silicate-synthetic powder which has its crystalline phase is mixed with kaolin mineral.

The crystallized silicate-synthetic powder and the high-strengthened porcelain body of the present invention is effective for increasing strength of the porcelain body by forming the crystalline phases structure which is distributed uniformly in the porcelain body and has further the second crystalline phase and the third crystalline phase in addition to the crystalline phase by the crystallized silicate-synthetic powder.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same and similar reference numbers.

DETAILED DESCRIPTION

Figure 1:
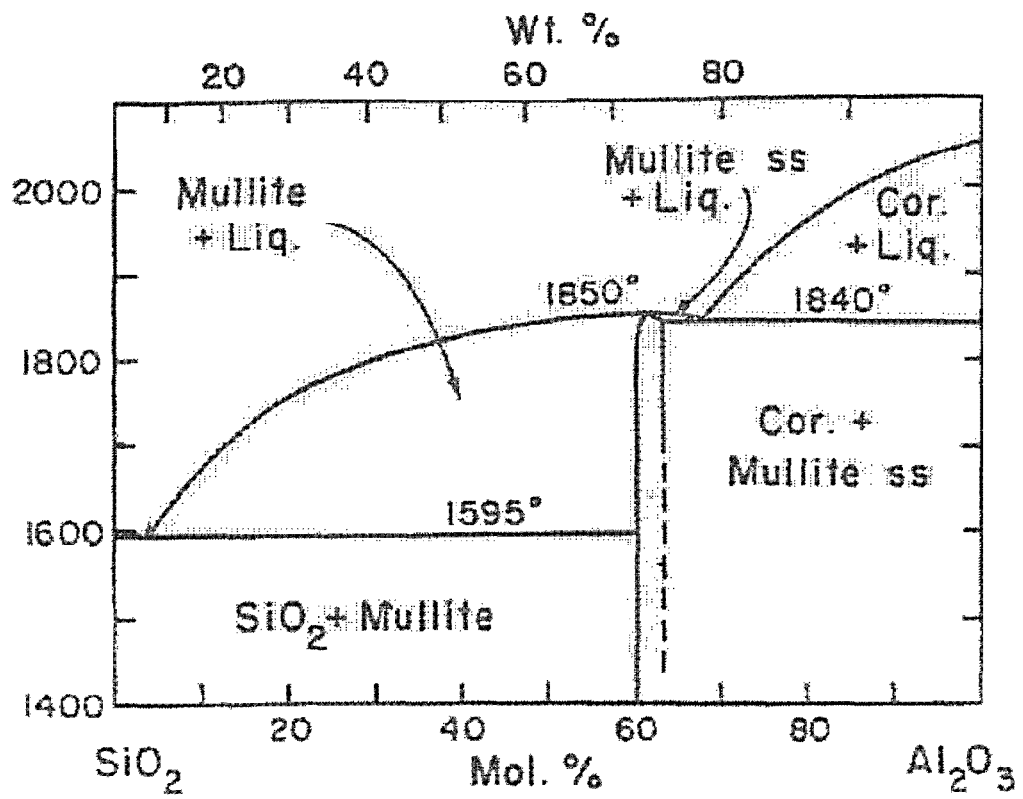
FIG. 1 is a phase diagram of $Al_2O_3$—$SiO_2$ System.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Hereinafter, a crystallized silicate-synthetic powder and a high-strengthened porcelain body including the same according to exemplary embodiments of the present invention will be described in detail with reference to the accompanying drawings.

First of all, a crystallized silicate-synthetic powder according to one embodiment of the present invention will be described below.

The crystallized silicate-synthetic powder according to one embodiment of the present invention includes a mullite ($3Al_2O_3.2SiO_2$) crystalline phase, a anorthite ($CaO.Al_2O_3.2SiO_2$) crystalline phase and a corundum ($Al_2O_3$) crystalline phase. In the crystallized silicate-synthetic powder, preferably, a fraction of the mullite crystalline phase is 30 to 50%, a fraction of the anorthite crystalline phase is 30 to 50% and a faction of the corundum crystalline phase is 10 to 30%. Meanwhile, the crystallized silicate-synthetic powder may include a fraction of the mullite crystalline phase is 30 to 50%, a fraction of the anorthite crystalline phase is 10 to 20% and a faction of the corundum crystalline phase is 10 to 30%, if the crystallized silicate-synthetic powder include further other crystalline phase which is formed additionally by a process condition. The crystallized silicate-synthetic powder is formed into Congruent Composition Crystallized Powder and utilized as sintering agent. In a sintering process of the porcelain body, in other words, the crystallized silicate-synthetic powder maintains a crystalline phase of itself in a glassy matrix constituting the porcelain body, and reinforces a frame structure of the porcelain body to enhance the strength of the porcelain body. In addition, the crystallized silicate-synthetic powder which acts as a crystallizing agent in a sintering process of the porcelain body generates the second crystalline phase or the third crystalline phase. Therefore, the crystallized silicate-synthetic powder is mixed as a sintering agent with kaolin mineral (clay or kaolin) which is raw material of the porcelain body and forms the high-strengthened porcelain body. Also, unlike feldspar, when utilized as the sintering agent, since the crystallized silicate-synthetic powder has a short melting point zone and a short sintering zone, it is possible to obtain uniform contraction and homogenized sintering. In addition, the crystallized silicate-synthetic powder is formed from kaolin mineral and forms additionally the crystalline phase in the glassy matrix constituting the porcelain body so that crystallized silicate-synthetic powder increases the strength of the porcelain body and reduces the thermal shrinkage. Meanwhile, since feldspar utilized before as the sintering agent is melted in advance in the firing process, this feldspar may cause a deformation of the porcelain body according to a particle wetting and a viscous to cause a relatively uneven contraction of the porcelain body.

Figure 2:
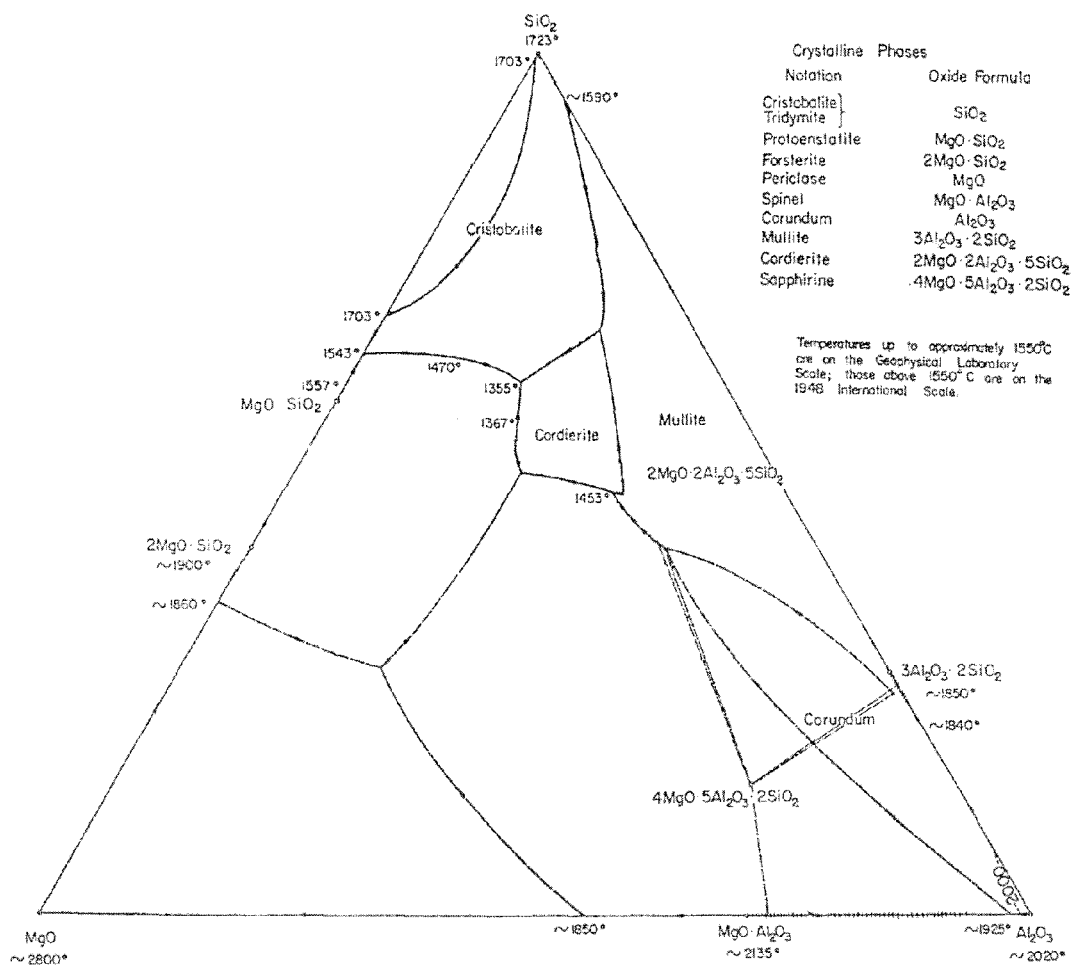
FIG. 2 is a phase diagram of $Al_2O_3$—$SiO_2$—MgO System.
Figure 3:
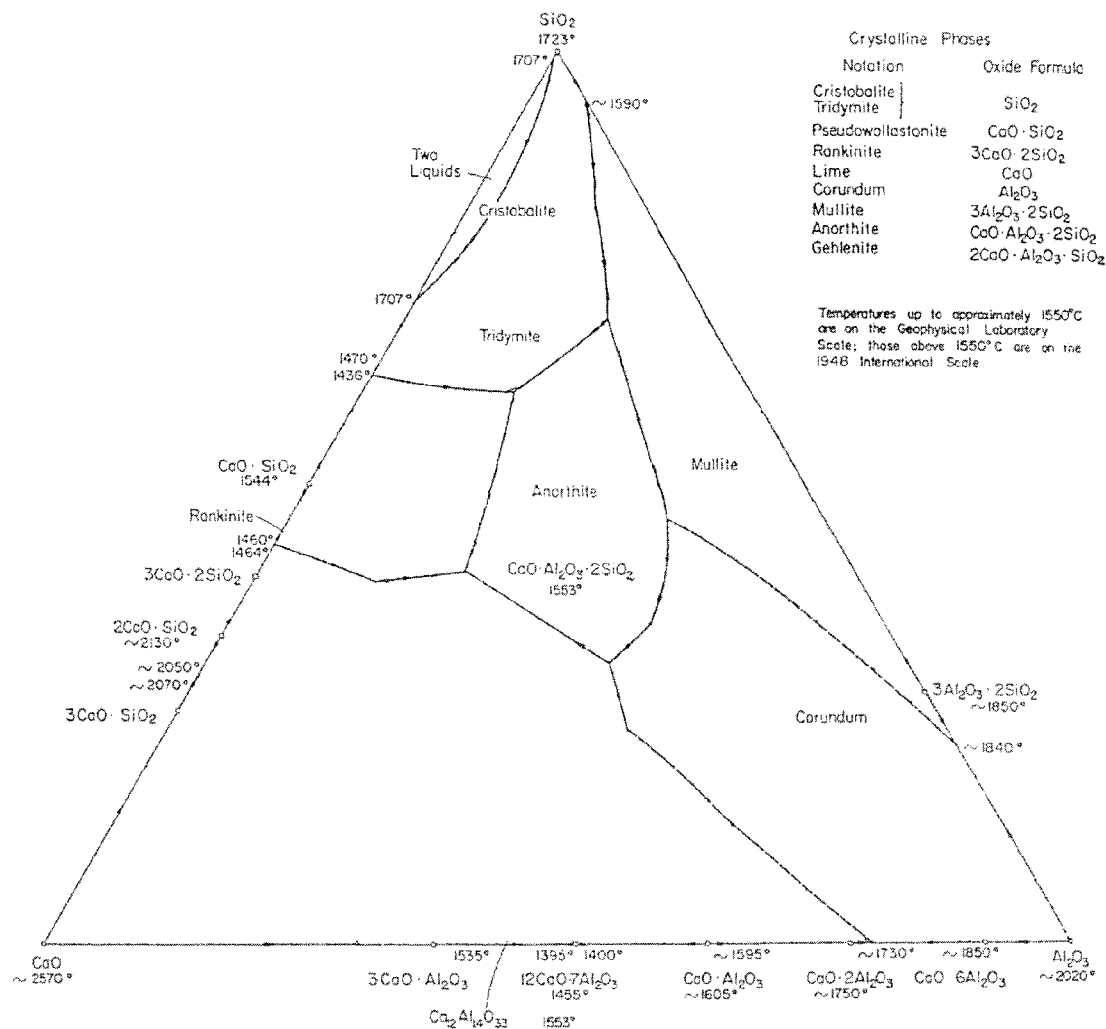
FIG. 3 is a phase diagram of CaO—$Al_2O_3$—$SiO_2$MgO-system.
Figure 4:
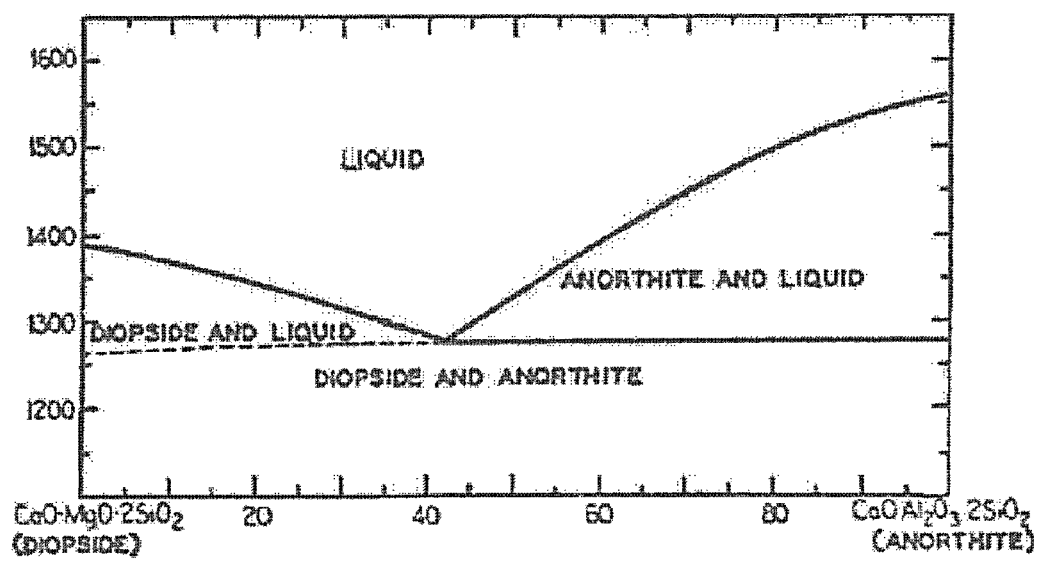
FIG. 4 is a phase diagram of diopside-anorthite system.

The crystallized silicate-synthetic powder is synthesized in the firing process for the powder of raw materials in which kaolin ($Al_2O_3.2SiO_2$), dolomite ($CaCO_3.MgCO_3$), limestone ($CaCO_3.MgCO_3$) and alumina ($Al_2O_3$) are mixed. With respect to total 100 wt % of the crystallized silicate-synthetic powder, kaolin of 40 to 60 wt %, dolomite of 10 to 20 wt %, limestone of 5 to 15 wt % and alumina of 10 to 30 wt % are mixed to form the crystallized silicate-synthetic powder. At this time, a content of raw material powder to be mixed for the crystallized silicate-synthetic powder was determined by employing the phase diagrams of FIG. 1 to FIG. 4. A composition ratio of $Al_2O_3$—$SiO_2$—MgO was determined by the compositions of formation zones of the mullite and the corundum in FIG. 2. Instead of alumina, in addition, aluminum hydroxide ($Al(OH)_3$) may be utilized to form the crystallized silicate-synthetic powder. In addition, magnesite ($MgCO_3$) may be utilized as a source material of MgO to form the crystallized silicate-synthetic powder. The firing process is carried out at the firing temperature of 1,200~1,300° C. for 4 to 6 hours to form the crystallized silicate-synthetic powder. At this time, as the firing atmosphere is maintained in an atmosphere or an oxidation atmosphere. After completing the firing process, an additional pulverizing process may be performed for the crystallized silicate-synthetic powder.

Next, the high-strengthened porcelain body including the crystallized silicate-synthetic powder according to one embodiment of the present invention is illustrated.

The high-strengthened porcelain body according to one embodiment of the present invention is formed by sintering porcelain body powder obtained by mixing kaolin mineral and the crystallized silicate-synthetic powder. Beside kaolin, kaolin mineral means silicate-based mineral such as clay or agalmatolite. A kaolin mineral may contain kaolin, or clay and agalmatolite. A component analysis for the crystallized silicate-synthetic powder and kaolin mineral is shown in Table 1. The analysis result for the crystallized silicate-synthetic powder is for any one of compositions according to one embodiment of the invention.

| Raw material | $SiO_2$ | $Al_2O_3$ | $Fe_2O_3$ | CaO | MgO | $K_2O$ | $Na_2O$ | $TiO_2$ | $P_2O_5$ | LOI | Total |
|---|---|---|---|---|---|---|---|---|---|---|---|
| crystallized silicate-synthetic powder | 42.13 | 43.26 | 0.28 | 8.57 | 3.70 | 0.03 | — | 0.01 | — | 10.1 | 100 |
| Kaolin | 47.41 | 35.5. | 0.80 | 0.21 | 0.15 | 0.38 | 0.02 | 0.43 | 0.17 | 14.93 | 100 |

Silica and alumina are main component of kaolin, these silica and alumina form glassy matrix in the high-strengthened porcelain body and simultaneously act as a frame of the high-strengthened porcelain body. Kaolin is pulverized into particles having a size of several microns and then mixed.

Since the crystalline phase of the crystallized silicate-synthetic powder is maintained in the glassy matrix, the crystallized silicate-synthetic powder increases the strength of the porcelain body and reduces the thermal shrinkage of the porcelain body.

The high-strengthened porcelain body contains kaolin of 70 to 80 wt % with respect to total weight thereof. In case that kaolin mineral contain kaolin and agalmatolite, the high-strengthened porcelain body may contain kaolin of 40 to 50 wt % and agalmatolite of 30 to 40 wt % with respect to total weight thereof.

The high-strengthened porcelain body contains the crystallized silicate-synthetic powder of 20 to 30 wt % with respect to total weight thereof. If a content of the crystallized silicate-synthetic powder is too low, a content of the crystalline phase in the high-strengthened porcelain body is low so that the flexural strength of the high-strengthened porcelain body is reduced. On the contrary, if a content of the crystallized silicate-synthetic powder is too high, the thermal shrinkage of the high-strengthened porcelain body is increased.

The crystallized silicate-synthetic powder and kaolin mineral are weighted within the above composition range, mixed and fired. After the firing process, mixture of crystallized silicate-synthetic powder and kaolin mineral is finely pulverized and sieved with a sieve with 325 mesh to produce a porcelain body powder. The porcelain body powder is sintered in the temperature of 1,230 to 1,300° C. for three hours or more to form the high-strengthened porcelain body. The sintering process for the porcelain body powder is performed in the oxidizing atmosphere. The high-strengthened porcelain body is formed through a liquid phase sintering process of the porcelain body powder, and the crystalline phase caused by the crystallized silicate-synthetic powder is uniformly distributed in the glassy matrix. To be more concrete, the crystallized silicate-synthetic powder is uniformly distributed between kaolin mineral. In the liquid phase sintering process, in addition, the crystallized silicate-synthetic powder is not decomposed and is reacted with kaolin mineral through an interfacial reaction. As a result, the crystallized silicate-synthetic powder distributes in the form of the crystalline phase and is sintered to from the densed high-strengthened porcelain body. In addition, in the liquid phase sintering process, a second crystalline phase which is spinel ($MgO.Al_2O_3$) crystalline phase or mullite crystalline phase, and a third crystalline phase which is cordierite crystalline phase is generated and distributed in the glassy matrix. The mullite crystalline phase of the second crystalline phase may be formed additionally in the sintering process. Therefore, since the crystalline phase obtained by the crystallized silicate-synthetic powder and the second crystalline phase and the third crystalline phase formed in the liquid phase sintering process are uniformly distributed in the glassy matrix of the high-strengthened porcelain body, the strength of the high-strengthened porcelain body is increased. The high-strengthened porcelain body has the flexural strength of 180 to 230 MPa. In addition, since the crystalline phases having the relatively low thermal expansion are distributed in the glassy matrix, the thermal expansion of the high-strengthened porcelain body is reduced. The high-strengthened porcelain body has the thermal shrinkage of 10 to 13%. The above high-strengthened porcelain body may be utilized for dishware, sanitary pottery, insulator for a fixed resistor or an electric transformer.

Below, the crystallized silicate-synthetic powder and the high-strengthened porcelain body containing the same is described with reference to the specific embodiment.

First of all, in order to produce the crystallized silicate-synthetic powder, with respect to total 100 wt %, kaolin of 55 wt %, dolomite of 15 wt %, limestone of 10 wet % and alumina of 20 wt % were weighted and then mixed into a mixed powder. The mixed powder was fired at the firing temperature of 1,250° C. for five hour and an oxidation atmosphere was maintained as the firing atmosphere. After completing the firing process, the powder was pulverized and sieved with a sieve having 80 mesh to obtain the crystallized silicate-synthetic powder.

Subsequently, the crystallized silicate-synthetic powder of 30 wt % agalmatolite 0f 30 wt % and kaolin of 40 wt % were weighted and then mixed into a mixed. The mixed power was finely pulverized in a wet method and sieved with a sieve having 325 mesh to produce the porcelain body powder. The porcelain body powder was mixed with water and then molded through a mold into a green body having a rectangular bar shape. The green body was fired at the firing temperature of 1,300° C. for two hours in an oxidizing atmosphere to produce the high-strengthened porcelain body.

Figure 5:
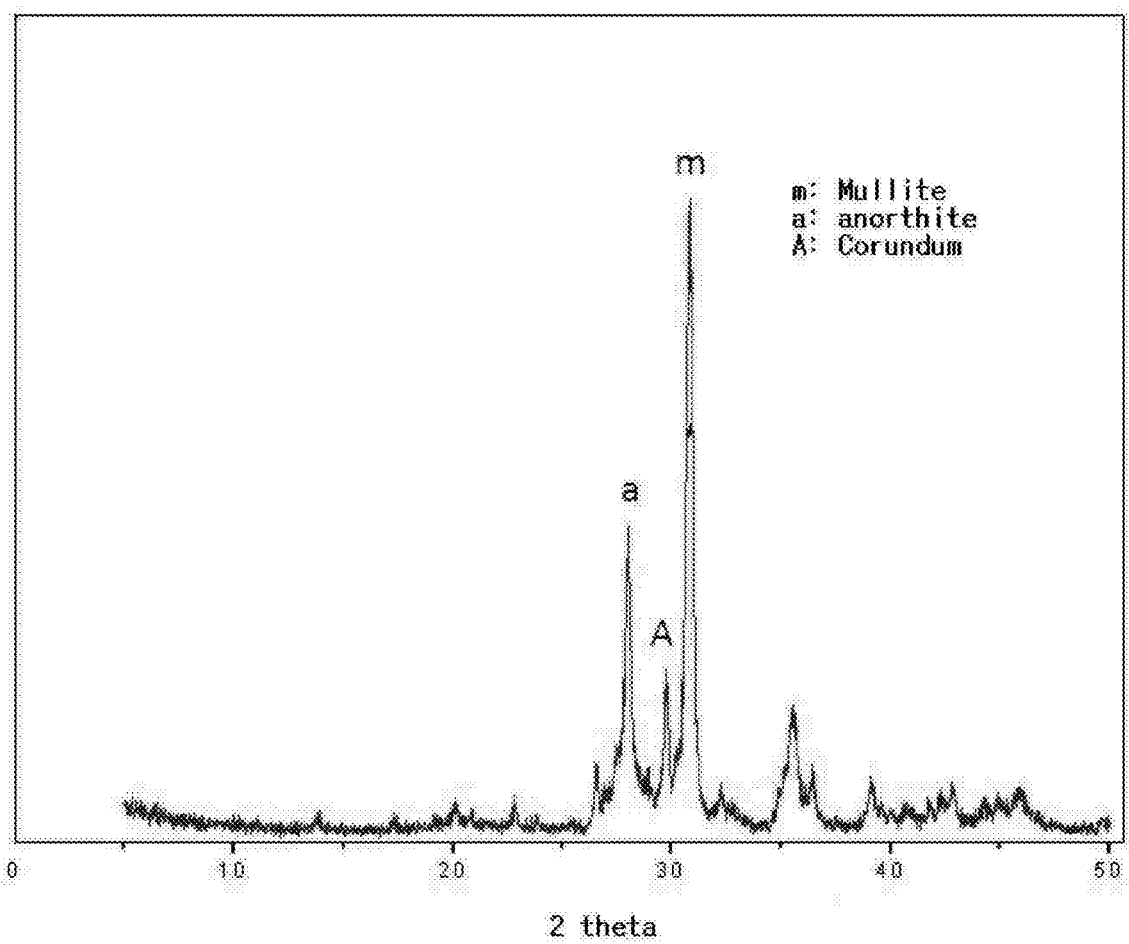
FIG. 5 is a XRD analysis graph of a crystallized silicate-synthetic powder according to one embodiment of the present invention.
Figure 6:
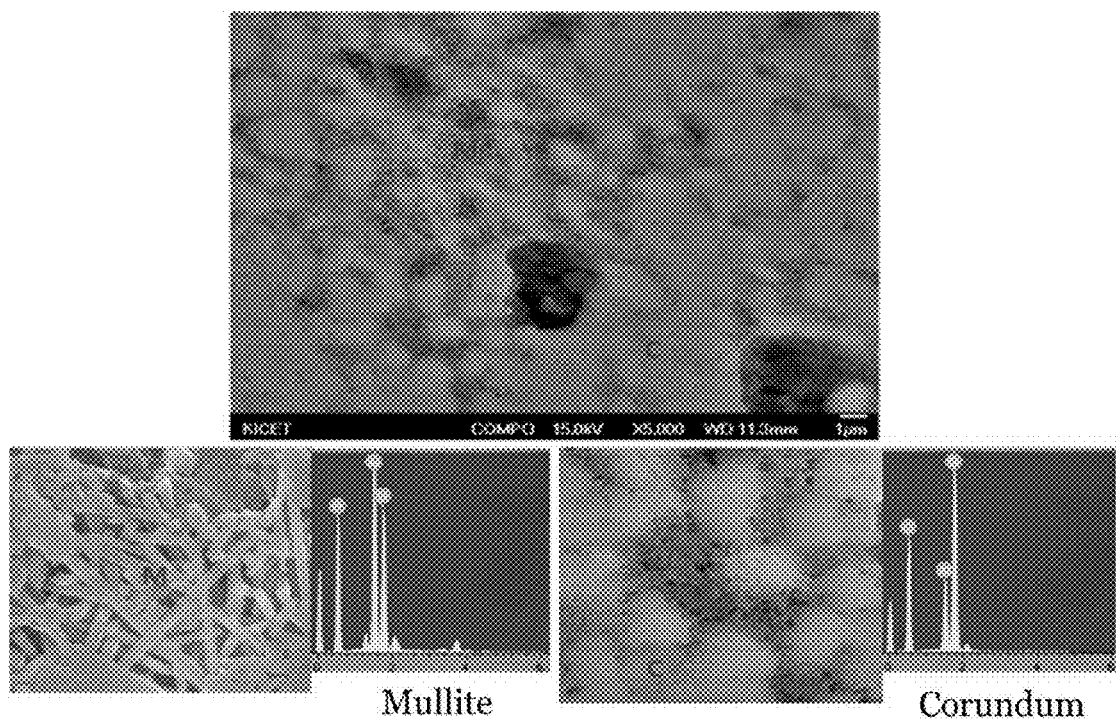
FIG. 6 is a analysis result of a EDS of a high-strengthened porcelain body according to one embodiment of the present invention.

The diffractometry was performed using X-ray diffracter (XRD) for the crystallized silicate-synthetic powder. As shown in FIG. 5, the anorthite crystalline phase, the mullite crystalline phase and the corundum crystalline phase were found in the crystallized silicate-synthetic powder. The flexural strength and the coefficient of thermal expansion of the high-strengthened porcelain body were measured. The flexural strengths and the coefficient of thermal expansions of the five (5) high-strengthened porcelain bodies were measured, respectively, and average values of five (5) measured the flexural strengths and the coefficient of thermal expansions were regarded as the flexural strength and the thermal expansion. The high-strengthened porcelain body had the flexural strength of 216 MPa. Therefore, the above result shows that the high-strengthened porcelain body of the present invention has the flexural strength greater than 120 to 150 MPa which is the flexural strength of the conventional porcelain body. It is judged that the anorthite crystalline phase, the mullite crystalline phase and the corundum crystalline phase of the crystallized silicate-synthetic powder are distributed in the glassy matrix so that the flexural strength of the high-strengthened porcelain body are increased. Since the crystallized silicate-synthetic powder is the congruent composition crystallized silicate-synthetic powder, the crystallized silicate-synthetic powder is not decomposed in the sintering process, but maintains its crystalline phase. As the result of component analysis of FIG. 6 using EDAX, the mullite crystalline phase and the corundum crystalline phase were found in the high-strengthened porcelain body.

Figure 7:
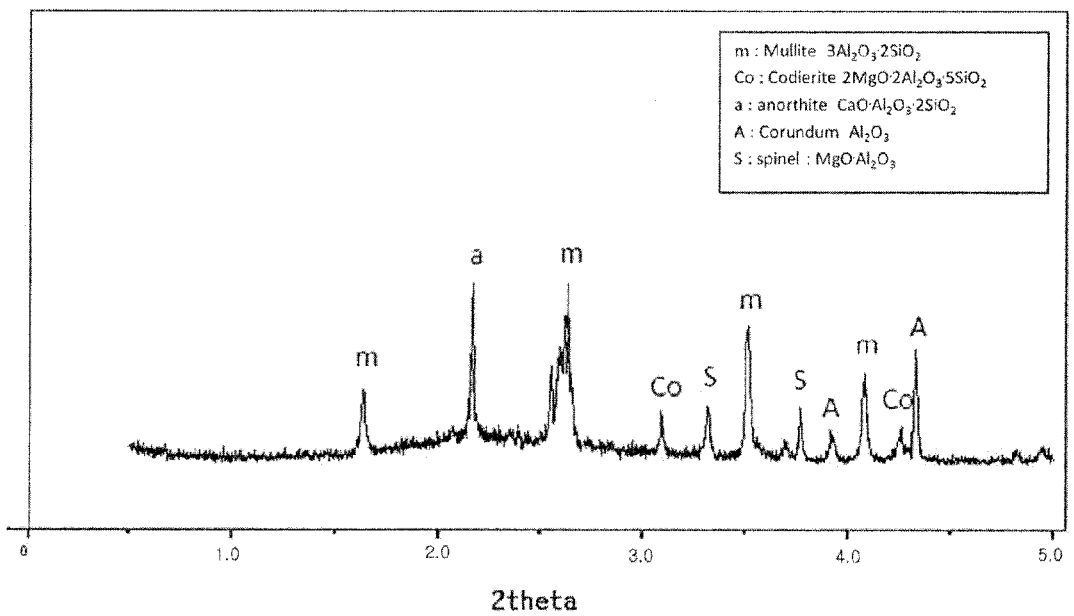
FIG. 7 is a XRD analysis graph of a high-strengthened porcelain body according to one embodiment of the present invention

In addition, it is judged that, in the high-strengthened porcelain body, while the crystallized silicate-synthetic powder is sintered together with the silica component, the solid phase sintering and the liquid phase sintering are carried out at the liquidous temperature and the amount of glassy matrix is reduced. In addition, the high-strengthened porcelain body generates the second crystalline phase or the third crystalline phase in the sintering process. As shown in XRD analysis graph of FIG. 7, the cordierite crystalline phase, the mullite crystalline phase and the spinel crystalline phase were found in the high-strengthened porcelain body. In addition, the anorthite crystalline phase, the mullite crystalline phase and the corundum crystalline phase by the crystallized silicate-synthetic powder were found in the high-strengthened porcelain body. Meanwhile, the mullite crystalline phase and the corundum crystalline phase may be formed additionally in the sintering process.

Figure 8:
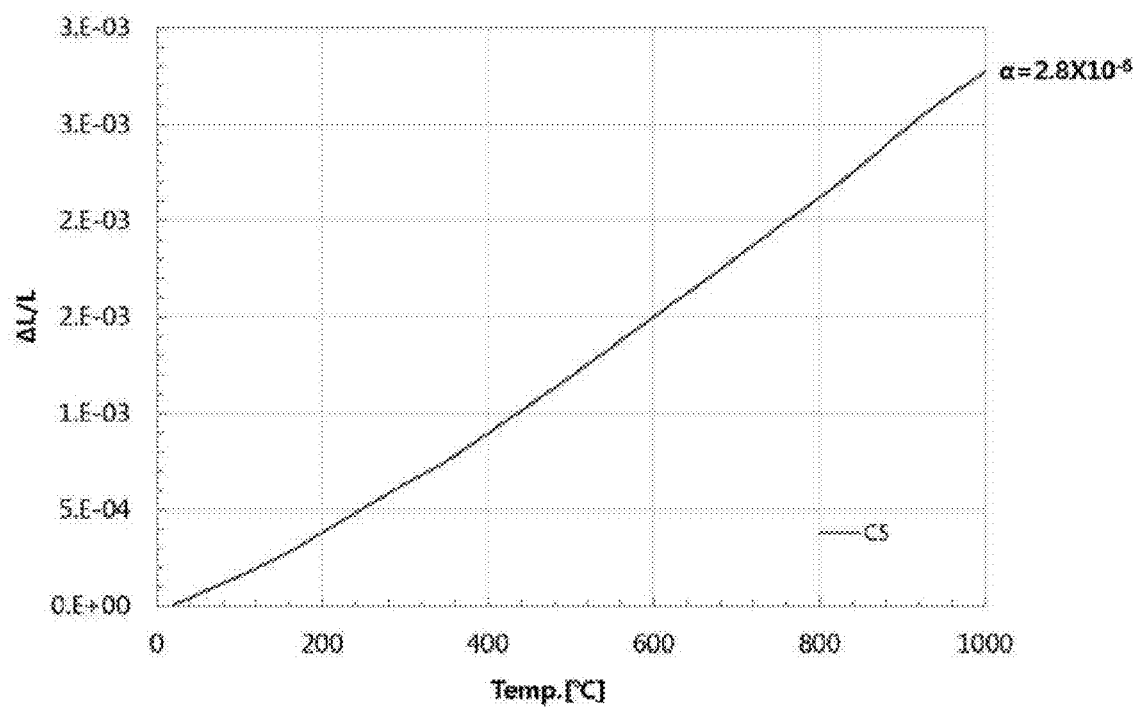
FIG. 8 is a graph showing measurement result of a coefficient of thermal expansion of a high-strengthened porcelain body according to one embodiment of the present invention.

In addition, the coefficient of thermal expansion of the high-strengthened porcelain body, as shown in FIG. 8, was lowered than that of the conventional porcelain body. The coefficient of thermal expansion of the high-strengthened porcelain body was measured to the value of $2.8\times10^{-6}$ and that of the conventional porcelain body was measured to the value of $5.2\times10^{-6}$. In addition, the measured thermal shrinkage of the high-strengthened porcelain body was 12.10%. While the flexural strength of the high-strengthened porcelain body was increased relatively, the thermal shrinkage of the high-strengthened porcelain body was underestimated.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims.

The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A high-strengthened porcelain body formed by mixing a crystallized silicate-synthetic powder and kaolin mineral, wherein the crystallized silicate-synthetic powder comprising a mullite ($3Al_2O_3.2SiO_2$) crystalline phase, a anorthite ($CaO.Al_2O_3.2SiO_2$) crystalline phase, and a corundum ($Al_2O_3$) crystalline phase.

2. The high-strengthened porcelain body of claim 1, wherein the crystallized silicate-synthetic powder of 20 to 30 wt % with respect to the total weight of the high-strengthened porcelain body and the kaolin mineral of 70 to 80 wt % with respect to the total weight of the high-strengthened porcelain body are comprised.

3. The high-strengthened porcelain body of claim 1, comprises
   a mullite crystalline phase, a anorthite crystalline phase, and a corundum crystalline phase by the crystallized silicate-synthetic powder,
   a spinel crystalline phase or a mullite crystalline phase which is formed as the second crystalline phase in the liquid phase sintering, and
   a cordierite crystalline phase which is formed as the third crystalline phase in the liquid phase sintering.

4. The high-strengthened porcelain body of claim 1, wherein a fraction of the mullite crystalline phase in the crystallized silicate-synthetic powder is 30 to 50%, a fraction of the anorthite crystalline phase is 30 to 50% and a faction of the corundum crystalline phase is 10 to 30%.

5. The high-strengthened porcelain body of claim 1, wherein the crystallized silicate-synthetic powder is formed by mixing kaolin ($Al_2O_3.2SiO_2$), dolomite ($CaCO_3.MgCO_3$), limestone ($CaCO_3.MgCO_3$) and alumina ($Al_2O_3$).

\* \* \* \* \*